(12) United States Patent
Kitazawa (10) Patent No.: US 7,016,803 B2
(45) Date of Patent: Mar. 21, 2006

(54) ACCELERATION CONTROL DEVICE

(75) Inventor: Keiichi Kitazawa, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/954,607

(22) Filed: Oct. 1, 2004

(65) Prior Publication Data

US 2005/0075826 A1  Apr. 7, 2005

(30) Foreign Application Priority Data

Oct. 6, 2003  (JP) .............. 2003-347035

(51) Int. Cl.
*B60K 31/04* (2006.01)

(52) U.S. Cl. ............... 702/142; 702/141; 701/70; 701/93; 123/349; 123/350

(58) Field of Classification Search ........... 702/141, 702/142, 33, 105; 701/70, 93; 123/349, 123/350

See application file for complete search history.

(56) References Cited

U.S. PATENT DOCUMENTS

| | | | | |
|---|---|---|---|---|
| 4,408,293 A | * | 10/1983 | Avins | 701/93 |
| 5,532,929 A | * | 7/1996 | Hattori et al. | 701/110 |
| 6,078,860 A | * | 6/2000 | Kerns | 701/93 |
| 6,304,809 B1 | * | 10/2001 | Cullen et al. | 701/93 |
| 6,330,506 B1 | * | 12/2001 | Roulet | 701/93 |
| 2004/0128057 A1 | | 7/2004 | Kitazawa et al. | |

FOREIGN PATENT DOCUMENTS

JP    2000-43611    2/2000

* cited by examiner

*Primary Examiner*—John Barlow
*Assistant Examiner*—Hien Vo
(74) *Attorney, Agent, or Firm*—Pillsbury Winthrop Shaw Pittman LLP (57) ABSTRACT

In order to improve a response to a sensitivity of an accelerator pedal of a motor vehicle and a sudden acceleration of the vehicle, width of an insensitive zone provided in a vicinity of a portion of a first logic pattern for auto-cruise control, in which portion a difference of accelerator opening is zero, is made very narrow or a second logic pattern having substantially no insensitive zone is provided, which is selected under a specific condition such as when the vehicle runs on an ascending road.

2 Claims, 7 Drawing Sheets

ACCELERATION CONTROL DEVICE

BACKGROUND OF THE INVENTION

1. Field of the Invention

The present invention relates to an acceleration control device for use in a motor vehicle equipped with an internal combustion engine for driving the motor vehicle. The present invention relates to a control system provided in a path for converting an amount of operation of an accelerator pedal operated by a driver of a motor vehicle into an electric signal and transmitting the electric signal to an actuator for controlling an opening of an accelerator of an engine and including a program control circuit. The present invention relates to a device, which can be utilized in various engines utilizing liquid fuels although it was developed for a motor vehicle equipped with a diesel engine. The present invention relates to an improvement of an auto-cruise device. The present invention relates to an improvement of fuel consumption and an improvement of engine exhaust gas.

2. Description of Related Art

An auto-cruise device for a motor vehicle is very popular nowadays. The auto-cruise device is generally defined as an automatic control device, a control of which is activated by a switching operation of a driver of the motor vehicle. A running speed of the motor vehicle is set as an aimed constant vehicle speed by the automatic control device at a time when the switching operation is performed by the driver. An accelerator opening of an engine of the motor vehicle is automatically controlled by the automatic control device such that the running speed of the vehicle is continuously maintained at an aimed constant speed. When such auto-cruise device is effectively operating, it is possible to run the motor vehicle at the constant speed even when an accelerator pedal of the motor vehicle is released. Such auto-cruise device has been widely utilized for a long distance cruise and/or a constant speed cruise of a motor vehicle.

It has been usual that a control of such conventional auto-cruise device can be released by a switching operation, a brake pedal operation or shift-down operation of a change gear by a driver of a motor vehicle. Further, such conventional auto-cruise devices is usually constructed in such a way that a motor vehicle can be accelerated overriding the control of the auto-cruise device when a driver steps on an accelerator pedal of a motor vehicle substantially in a state where the auto-cruise device is operating effectively. When a change switch capable of changing an aimed constant speed is provided in the operating switch circuit of the auto-cruise device, it is possible to accelerate or decelerate the motor vehicle by changing the aimed speed by means of the switch even if the driver's foot is separated from the accelerator pedal.

Further, it is usual for such conventional device that, when an aimed speed is changed by a driver's operation in a state where such auto-cruise device is operating effectively, an acceleration or deceleration control of a motor vehicle is executed such that the current running speed of the vehicle immediately reaches a new aimed speed. An example of such system is disclosed in JP2000-043611A (Matsuda). In the Matsuda invention, when an acceleration control or deceleration control of the motor vehicle running at a certain speed is performed, a control gain is changed according to the certain speed, as a result of which controllability is improved. That is, in the Matsuda invention, when an aimed speed is changed step by step under an automatic control, a feedback control or a feedforward control is utilized such that the running speed smoothly approaches a new aimed speed, that is, such that the so-called overshoot or control delay does not occur.

In the well known conventional auto-cruise device, the control thereby is activated by the driver as mentioned above and, so long as the present inventors know, there is no auto-cruise device, a control of which is automatically activated without requiring driver's operation when certain constant condition is established. Further, in the known auto-cruise device, a driver basically releases an accelerator pedal after the cruise control is activated as mentioned previously. However, although the conventional auto-cruise device in which a cruise control can be overridden after the cruise control is activated is known, there is no technical thought for changing a control function for controlling the accelerator opening of an engine, according to a depressing amount of an accelerator pedal, so long as the inventors of the present invention know.

Besides the auto-cruise device, it has been strongly requested by vehicle users to improve specific fuel consumption (distance covered by unit amount of fuel). Particularly, specific fuel consumption is one of very important factors when purchasers of commercial vehicles such as trucks or buses select vehicles. In addition, environmental contamination due to exhaust gas of vehicle engine has become a serious problem recently and possible measures on reduction of quantity of sulfur in diesel fuel are having been investigated by related surveying and research organizations. The reduction of sulfur content in diesel fuel requires additional diesel oil refining steps, causing-fuel cost to be increased. Therefore, it is presumed that the request for improvement of specific fuel consumption of vehicle is increased more and more.

In order to improve the specific fuel consumption effectively, the inventors of the present invention paid attention to the fact that one of various resistances occurring in a running vehicle, which require excessive fuel consumption, is an abrupt acceleration. That is, the resistances can be classified to an air resistance of a vehicle, a rolling frictional resistance of wheels thereof, an acceleration resistance and a gradient resistance, etc., and, when quantitative distribution of these resistances is considered, it is clear that a running resistance, which is controllable according to the running mode of vehicle, is the acceleration resistance. In order to reduce an influence of the acceleration resistance, it is preferable, to control an amount of fuel supply such that, when a new aimed vehicle speed is set, a practical vehicle speed approaches the new aimed vehicle speed gently and reasonably. In other words, it is effective to reasonably control an amount of fuel supply, which is used to generate an acceleration torque.

In the existing circumstances, such control may be realized by training drivers. That is, it is necessary to drum individual vehicle driver into the practice that, when a vehicle is to be accelerated, the driver must not ram an accelerator pedal but steps on it gradually and releases the pedal after a desired speed is achieved.

The inventions of the present invention had studied a possibility of realizing such practice, which is to be performed by individual driver, automatically by improving an auto-cruise device. That is, the present inventors had studied the possibility of controlling an amount of fuel supply to an internal combustion engine of a motor vehicle such that, when a driver rams an accelerator pedal of the vehicle in order to accelerate the vehicle, a reasonable acceleration is performed by not reflecting a depressing amount of the accelerator pedal directly to an amount of fuel supplied to the engine. This study is meaningless when a driver does not activate the conventional auto-cruise device in which the control is manually activated by the driver. On the other hand, a starting performance of the vehicle is degraded undesirably when an auto-cruise device is constructed such that a control of the auto-cruise device is automatically activated at an engine start time in a parking state and the control for gradually increasing an amount of fuel supplied to the engine is executed even if the driver rams the acceleration pedal as mentioned above.

As a result of the study, the present inventors had invented an acceleration control device, which is disclosed in JP2004-50904A. In the disclosed acceleration control device, an auto-cruise device is automatically activated when a constant vehicle speed is detected. In a state in which an auto-cruise control is effective, an aimed speed is incrementally set with small changing step even when the acceleration pedal is rammed, so that fuel supply is controlled such that a large amount fuel is not supplied at a time.

The present inventors have conducted various tests on the acceleration control device disclosed in JP2004-50904A and found that there are two matters thereof, which are to be improved.

The acceleration control device includes accelerator opening difference detection means for detecting a difference ($\Delta$) in accelerator opening between a current vehicle speed and an aimed vehicle speed. The opening difference detection means includes a control map having an insensitive zone in a vicinity of $\Delta=0$, at which a difference of accelerator opening detected by the difference detection means becomes constantly 0. The inventors of the present invention found that, although the insensitive zone functions appropriately when a vehicle with light load is running on a flat road, the insensitive zone may not work as intended by a driver when the vehicle is running with heavy load, for example, when the motor vehicle is running on an uphill road. That is, when the driver of a motor vehicle, which is running with heavy load, is aware of a speed down of the vehicle and steps on the accelerator pedal, it is empirically known that the vehicle does not respond to the depression of the accelerator pedal or barely responds thereto when the driver further steps on the accelerator pedal. Such phenomenon is inconvenient in a case where a motor vehicle is running on an ascending road, slope of which increases with increase of running distance. This is one of the matters to be improved.

Besides, this matter to be improved, the acceleration control device is constructed such that, when a motor vehicle running on a road passes another vehicle on the same road, the passing vehicle appropriately responds to the depression of the accelerator pedal. That is, a direction indicator is operated when the passing operation is performed. By utilizing the operation of the direction indicator, the acceleration control device is constructed such that the vehicle temporarily responds to the operation of the accelerator pedal during the passing operation. The acceleration control device is acceptable so long as the passing operation is concerned. However, when a usual road or a freeway along which the vehicle is running at a constant speed becomes an uphill road and a driver steps on the accelerator pedal to maintain the speed, there is a case where the vehicle does not respond to depression of the accelerator pedal. This is the other matter to be improved.

SUMMARY OF THE INVENTION

A first object of the present invention is to improve, in view of the drivability of motor vehicle, an auto-cruise device having a construction in which an insensitive zone is provided in a region of a control map, in which a difference ($\Delta$) of accelerator opening between a current vehicle speed and an aimed vehicle speed is small.

A second object of the present invention is to improve the response of a motor vehicle running on a road to a depression amount of an accelerator pedal when it is necessary for the motor vehicle to abruptly accelerate the vehicle by using an auto-cruise device.

In order to achieve the first object of the present invention, a control map having set in the auto-cruise device, which has the insensitive zone provided in the vicinity of a portion of the control map at which the difference ($\Delta$) of accelerator opening is zero is used as a first control map for light load or for flat road surface and a second control map is provided. The second control map has no insensitive zone in the vicinity of a portion of the control map at which the difference of accelerator opening is zero or has a very narrow insensitive zone provided in the vicinity of the portion of the control map and is set for a heavy load or an ascending road. The first control map and the second control map are switched under control of the accelerator opening difference detection means for detecting a difference in accelerator opening between a current vehicle speed and an aimed vehicle speed. It is possible to set a width of the insensitive zone to different values according to the loads. Further, it is possible to provide a third and fourth control maps and to switch these control maps under control of the accelerator opening difference detection means.

In order to achieve the second object of the present invention, the condition for temporarily inhibiting the auto-cruise operation when a specific operation is performed by a driver of a motor vehicle running under control of the auto-cruise device is further expanded. That is, the condition of driving operation includes (i) a direction indicator is operated and an accelerator pedal is stepped on beyond a predetermined value, and (ii) an accelerator pedal is stepped on beyond the predetermined value in a shift-up mode of operation.

The condition (i) is provided under supposition of the driving operation of a motor vehicle when the vehicle has to be temporarily accelerated in order to pass a preceding motor vehicle as disclosed in JP2004-50904A. The condition (ii) is newly provided under supposition of the driving operation in which a speed of a motor vehicle running on a road has to be kept constant when the road becomes gradually ascending.

That is, the acceleration control device according to a first aspect of the present invention comprises first aimed accelerator opening calculation means for calculating an aimed accelerator opening (Ac) according to an information of a depressing amount (Am) of an accelerator pedal and a current vehicle speed (V), accelerator opening difference detection means, means for providing a control output according to which a difference ($\Delta$=Am−Ac) of accelerator opening approaches zero, start means for automatically starting the calculation of the aimed accelerator opening (Ac) when a constant speed running state of the motor vehicle is detected according to the information including the vehicle speed (V) and second aimed accelerator opening calculation means for calculating the aimed accelerator opening (Ac) according to a vehicle speed difference ($\delta$=Vt−V) between an hypothetic aimed vehicle speed (Vt) and the vehicle speed (V) while sequentially changing the hypothetic aimed vehicle speed (Vt) little by little according to the accelerator opening difference ($\Delta$) and the current vehicle speed (V), wherein the accelerator opening difference detection means includes means for providing a plurality of control maps including the first control map for light load having the insensitive zone, which is provided in the vicinity of a position of the control map at which the accelerator opening difference (Δ) becomes zero (Δ=0) and which outputs the throttle opening difference as constantly zero, and the second control map for heavy load, which has a very narrow insensitive zone in the vicinity of a position of the control map at which the accelerator opening difference (Δ) is zero and selecting one of the plurality of control maps according to an output of the accelerator opening difference detection means.

Further, the acceleration control device according to a second aspect of the present invention comprises first aimed accelerator opening calculation means for calculating an aimed accelerator opening (Ac) according to an information of depressing amount (Am) of an accelerator pedal and a current vehicle speed (V), means for providing a control output according to which a difference (Δ=Am−Ac) of accelerator opening approaches zero, start means for automatically starting the calculation of the aimed accelerator opening (Ac) when a constant speed running state of the vehicle is detected according to the information including the vehicle speed (V) and second aimed accelerator opening calculation means for calculating the aimed accelerator opening (Ac) according to a vehicle speed difference (δ=Vt−V) between a hypothetic aimed vehicle speed (Vt) and the vehicle speed (V) while sequentially changing the hypothetic aimed vehicle speed (Vt) little by little according to the accelerator opening difference (Δ) and the vehicle speed (V), the start means including, as input information for detecting that the vehicle is in a constant running state, an information related to the depression amount (Am) of the acceleration pedal, a fuel flow rate (F) and a position (Tm) of a change lever, in addition to the vehicle speed (V), the aimed accelerator opening calculation means including accelerator opening difference detection means for detecting the difference (Δ) of accelerator opening, aimed acceleration calculation means for obtaining an aimed acceleration (αt) from an output of the accelerator opening difference detection means, hypothetic aimed vehicle speed calculation means for calculating the hypothetic aimed vehicle speed (Vt) from the aimed acceleration (αt) and an initial speed (Vo) detected by the start means, speed difference calculation means for calculating the vehicle speed difference (δ) between the hypothetic aimed vehicle speed (Vt) and the vehicle speed (V) and auto-cruise control means for calculating the aimed accelerator opening (Ac) according to the vehicle speed difference (δ) and an initial throttle opening (Ao) generated by the start means, and inhibiting means for temporarily inhibiting the control of the auto-cruise control means when a specific operation is performed by a driver and inputting the information (Am) of the accelerator pedal directly or through a constant function to an engine of a vehicle as an acceleration input of an engine, wherein the specific operation includes an operation in which a direction indicator is operated and the accelerator pedal is stepped on beyond a predetermined amount or an operation in which the accelerator pedal is stepped on beyond a predetermined amount in a shift up mode.

According to the present invention, the control map of the acceleration control device for calculating an amount of depression of an accelerator pedal is improved by providing the insensitive zone in the vicinity of a portion of the control map corresponding to the zero amount of depression of the accelerator pedal such that a motor vehicle appropriately responds to a driver's will on a flat road as well as an ascending road. Further, in addition to the case where the driver executes a passing by operating a direction indicator, the case where the running road becomes uphill and the vehicle enters into the shift up mode, the acceleration of the vehicle does sufficiently respond to the depression of the accelerator pedal.

According to the present invention, the sudden acceleration of a running vehicle is restricted, so that fuel economy can be improved. Although such economical effect shall be evaluated on the basis of actual results, it is estimated that the economical effect may be enough to reduce fuel consumption by at least several %. According to the present invention, the acceleration control device, which can automatically activate the auto-cruise control without requiring a switch operation by a driver can be obtained. According to the present invention, it is possible to reasonably increase the vehicle speed without excessively increasing an amount of fuel, which can not be burnt, even when the accelerator pedal of the running vehicle is substantially depressed. According to the present invention, excessive fuel consumption is prevented and unburned gas component in exhaust gas can be reduced. According to the present invention, the depressing amount of accelerator pedal is small after the acceleration control is started, the vehicle speed is controlled such that the speed at that time point is maintained as in the conventional auto-cruise device and, when the accelerator pedal is released, it is possible to immediately reduce the amount of fuel supply. In the present device, the acceleration performance at a start time of the vehicle is not impeded even when the amount of fuel supply is limited. The present device reduces a driver's uncomfortable feeling related to response of the vehicle to the depression of the accelerator pedal and can restrict excessive fuel supply.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
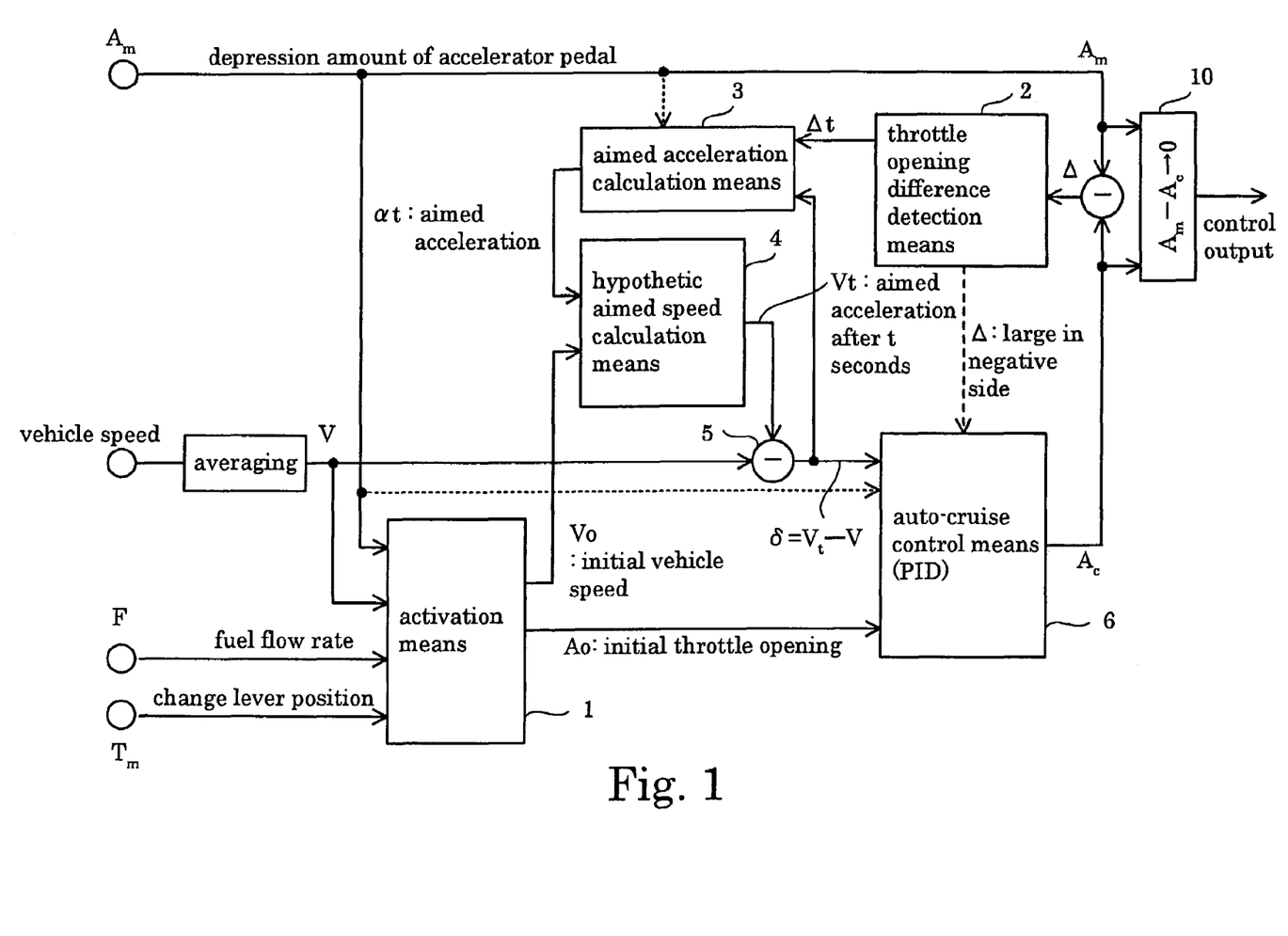
FIG. 1 is a block diagram of an acceleration control device according to an embodiment of the present invention.

An acceleration control device according to the present invention is constructed with a programmable controller loaded with software. In order to facilitate understanding of the acceleration control device of the present invention and the operation thereof qualitatively, the acceleration control device is shown by a block diagram in FIG. 1. Input information of the acceleration control device includes a depression amount (Am) of an accelerator pedal, a current vehicle speed (V), a flow rate of fuel (F) and a change gear position (Tm). The vehicle speed information (V) is obtained by averaging a signal from a rotary pulse detector provided on a propeller shaft of a motor vehicle every short time (in this embodiment, 1 second). The input information is supplied to the programmable control circuit through interfaces, which are not shown. The acceleration control device calculates an aimed accelerator opening (Ac) on the basis of the input information and outputs control outputs such that an accelerator opening difference $\Delta$ between the depression amount Am and the aimed accelerator opening Ac, that is, $$\Delta = Am - Ac,$$

approaches zero. An output of an accelerator opening difference calculation circuit 10 is sent to an adjusting actuator of a fuel supply valve of an engine of the vehicle as the control output of the acceleration control device.

The acceleration control device utilizes a conventional auto-cruise control means 6. The auto-cruise control means 6 is the so-called PID control circuit, which executes a proportion control, an integration control and a differentiation control, and calculates the aimed throttle opening Ac such that a difference $\delta$ between an inputted aimed vehicle speed Vt and a current vehicle speed V, that is, $$\delta = Vt - V$$

becomes smaller and outputs the aimed accelerator opening Ac as an electric signal.

The acceleration control device of the present invention includes start means 1 for automatically starting an execution of the calculation control when it is detected from the information including the vehicle speed V, that the motor vehicle is running along a flat road at a constant speed. That is, when the vehicle speed, the change lever position and the flow rate of fuel are set as V±ΔV (for example, 60±10 Km/h), the n-th or higher position and f cc/s or smaller, respectively, and these conditions are satisfied for t seconds (for example, several seconds), the start means 1 starts an operation of the acceleration control device by generating an initial vehicle speed Vo and an initial throttle opening Ao. The initial accelerator opening Ao becomes an initial value of the accelerator opening in the auto-cruise control means 6.

Figure 2:
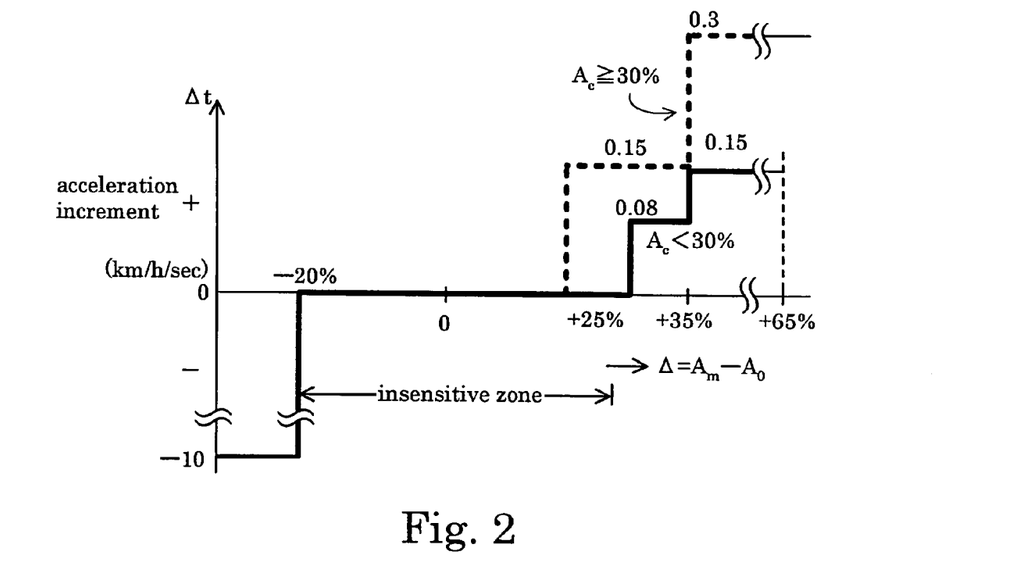
FIG. 2 is a graph showing characteristics of an accelerator opening detection unit shown in FIG. 1.

FIG. 2 is a graph showing operational characteristics of the throttle opening difference detection means 2. The difference $\Delta$ between the current accelerator opening Am and the aimed accelerator opening Ac is inputted to the accelerator opening difference detection means 2. The difference $\Delta$ is shown in abscissa in FIG. 2. The accelerator opening difference detection means 2 transforms the difference $\Delta$ with a functional characteristics shown in FIG. 2 and outputs a resultant transformed difference $\Delta$t. The transformed difference $\Delta$t represented in unit of [Km/h/sec] corresponds to an incremental acceleration. That is, in this embodiment, an insensitive zone having a center point at which the difference $\Delta$ is zero is set in a range −20%~+25% with respect to $\Delta$=0 and all values of the difference $\Delta$ in this insensitive zone are deemed as zero. According to the functional characteristics, a change of depression of the accelerator pedal in a range in which the depression change is small becomes invalid. When the difference $\Delta$ exceeds +25%, the accelerator opening difference detection means 2 outputs a transformed difference $\Delta$t, which changes step by step as shown by a solid line in FIG. 2. When the difference $\Delta$ is smaller than −20%, the transformed difference $\Delta$t becomes large value (−10, in FIG. 2) on a negative side.

The basic characteristics of the throttle opening difference detection means 2 is shown by the solid line in FIG. 2. However, the inventors of the present invention have found that, when the vehicle load is large, a sufficient acceleration performance may not be always obtained by only the characteristics shown by the solid line in FIG. 2. Therefore, according to the present invention, functional characteristics shown by a dotted line in FIG. 2 is added to the accelerator opening difference detection means 2 as a practical means. That is, when the aimed accelerator opening Ac generated by the auto-cruise control device 6 becomes very large under a condition that a vehicle runs along an ascending road with payload being large (when the accelerator opening difference $\Delta$ becomes +30% or more in this embodiment), the functional characteristics shown by the dotted line in FIG. 2 is temporarily employed instead of the characteristics shown by the solid line. That is, according to the present invention, the insensitive zone is slightly narrowed and the transformed difference $\Delta$t is set to a slightly large value in such situation.

Figure 3:
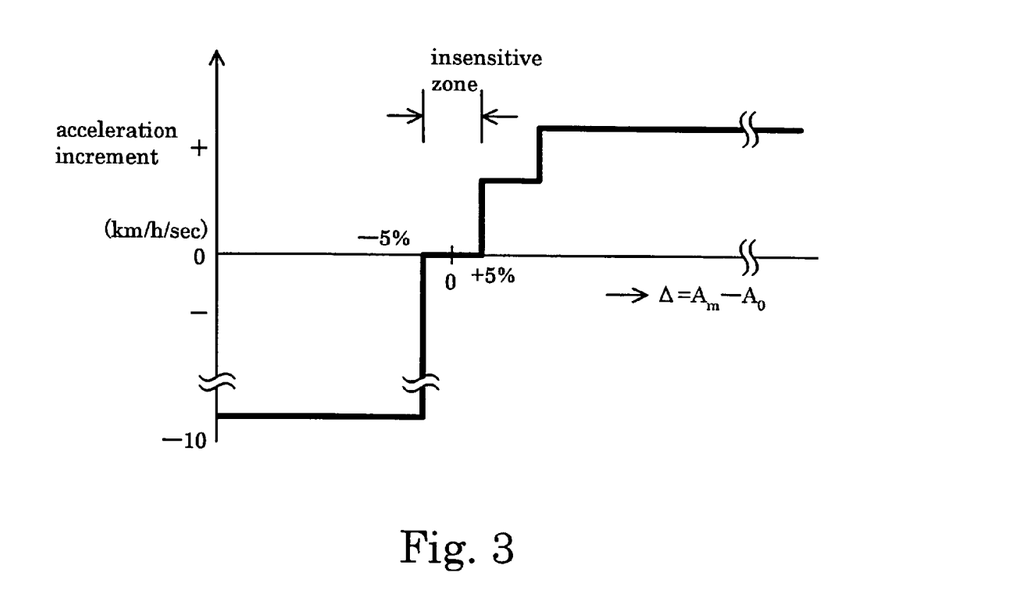
FIG. 3 is a graph showing characteristics of the accelerator opening detection unit shown in FIG. 1 when a very small insensitive zone is set in a control map.

Further, according to the present invention, in addition to the improvement achieved by the control map shown in FIG. 2, a second control map having an insensitive zone, which is narrower than that of the first control map shown in FIG. 2 and shown in FIG. 3, is provided. One of the first and second control maps is selected under control of the accelerator opening difference detection means 2. The second control map is utilized in a case where a driver suddenly steps on the accelerator pedal when a vehicle enters into an ascending road and a load thereof is increased. In such case, the first control map shown in FIG. 2 is temporarily switched to the second control map shown in FIG. 3 and the control is performed by using the second control map. An essential difference between the first control map and the second control map is the width of the insensitive zone shown in the abscissa and provided when the accelerator opening difference $\Delta$ is small. That is, in FIG. 2, the insensitive zone of the accelerator opening difference $\Delta$ is set in −20% to +25% with respect to $\Delta$=0, while, in FIG. 3, the insensitive zone is set as small as ±5% with respect to $\Delta$=0. With such setting of the difference $\Delta$ of accelerator opening, the acceleration or deceleration of the vehicle responds sensitively to the operation of the accelerator pedal by the driver in a case where the load of the vehicle is large. It should be noted that the widths of the insensitive zones shown in FIG. 2 and FIG. 3 are mere examples and can be changed suitably according to characteristics of vehicles. It is possible to embody the present invention by setting the width of the insensitive zone in the second control map to a value, which is smaller than ±5% and substantially zero.

The aimed acceleration calculation means 3 is a control map conversion circuit (or numerical table). The information of the difference $\Delta$ between the current accelerator opening Am and the aimed accelerator opening Ac is inputted to the aimed acceleration calculation means 3. In more detail, the converted difference $\Delta$t converted by the accelerator opening detection means 2 is inputted to the aimed acceleration calculation means 3. Further, the information of the difference (Vt−V) between the current vehicle speed V and the aimed vehicle speed Vt is inputted to the aimed acceleration detection means 3. The aimed acceleration at is read out by the control map conversion circuit on the basis of the two information. Polarity of the aimed acceleration αt is positive or negative correspondingly to the polarity of the difference (Vt−V).

The acceleration control device of the present invention further includes a hypothetic aimed vehicle speed calculation means 4. The hypothetic aimed speed calculation means 4 is constructed with an integration circuit for obtaining a time integral of the inputted acceleration αt and calculating the aimed vehicle speed Vt after a predetermined time t (seconds). The initial vehicle speed Vo generated by the activation means 1 is utilized as an initial value of integration. The speed difference calculation means (subtraction circuit) 5 calculates the difference δ between the aimed vehicle speed Vt and the current vehicle speed V, that is, $$\delta = Vt - V$$

and the calculated vehicle speed difference δ becomes the input information of the auto-cruise control device 6. The speed difference 6 is fed back to an input of the aimed acceleration calculation means 3.

In the control map conversion circuit provided in the aimed acceleration calculation means 3, the maximum value of the aimed acceleration is limited such that it does not become large on the positive (+) side. Further, the value of the output aimed acceleration αt is restricted so that an absolute value of the fed back difference δ between the aimed vehicle speed Vt and the current vehicle speed V does not become larger than a preliminarily set value. This control is performed by setting the control map as mentioned. For example, for the aimed acceleration αt, $$-10 < \alpha t < +0.3 \text{ (unit: km/h/s)}$$

and for the aimed vehicle speed Vt, $$V - 2 < Vt < V + 2 \text{ (unit: km/h)}$$

With such construction, even if the difference between the aimed vehicle speed Vt and the current vehicle speed V is large, the aimed speed calculation means 3 sends a value of the aimed acceleration, which is small. Therefore, the aimed vehicle speed calculated on the basis of the aimed acceleration becomes slightly larger than the current vehicle speed, so that the accelerator opening becomes small. When the current vehicle speed reaches the aimed vehicle speed, which is slightly larger than the current vehicle speed, the aimed acceleration calculation means 3 sends a new aimed acceleration αt afresh to perform a control such that the current vehicle speed becomes a smaller aimed vehicle speed. By such control, even if the driver tries a sudden acceleration by substantially depressing the accelerator pedal, the acceleration is restricted by the acceleration control device of the present invention so that a gentle and reasonable acceleration is performed, resulting in that excess consumption of fuel is restricted.

On the other hand, when the accelerator pedal of a vehicle running at a constant speed is suddenly released, the flow rate of fuel supplied to the engine is controlled to a small value immediately. That is, a limit value for the minus acceleration side, that is, the deceleration side, is not provided in the aimed acceleration calculation means 3 and the control map is set in the aimed acceleration calculation means 3 such that the accelerator opening immediately responds to the change of position of the accelerator pedal stepped on by the driver. In order to make the vehicle speed responsible to the position change of the accelerator pedal immediately, it is possible to provide a feedforward circuit between the accelerator opening difference detection means 2 and the auto-cruise control device 6 as shown by a dotted line in FIG. 1. In such case, since an increase of fuel consumption can be avoided and the vehicle immediately enters into an engine brake state when the accelerator pedal is released, degradation of drive feeling does not occur.

In this embodiment, the start means 1 generates the initial vehicle speed Vo and the initial throttle opening Ao when it starts the acceleration control. However, it is preferable that, even after the acceleration control device is activated, the initial vehicle speed Vo and the initial throttle opening Ao are updated every time when the condition set in the start means 1 is established. In such case, it is possible to prevent the output of the hypothetic aimed vehicle speed calculation means 4 from drifting inadvertently.

Further, when the auto-cruise control is effective, it is possible to provide a device for temporarily inhibiting the control by the driver. During the auto-cruise control is effectively executed, sudden acceleration of the vehicle is impossible even if the driver steps on the accelerator pedal substantially. For example, when the vehicle is running along a largely curved road or passes another vehicle through a passing lane, the engine output may become short. In order to solve such problem, the device for temporarily inhibiting the operation of the auto-cruise control device may be conditioned with an operation of a direction indicator of the vehicle by the driver. It is possible to provide means for terminating the inhibition of the control of the auto-cruise control means 6 when the direction indicator is turned right or left and the accelerator pedal is stepped on deeper than a predetermined value.

In this embodiment, means for temporarily inhibiting the control of the auto-cruise control means 6 is provided with a condition that the vehicle is in the shift up mode and the accelerator pedal is stepped on by a value larger than a predetermined value (for example, 95%), in addition to the condition of the operation of the direction indicator. With such construction of the acceleration control device of the present invention, the problem of the insufficient response of vehicle speed to the depression of the accelerator pedal when the road condition becomes uphill can be solved.

It is possible to automatically recover the control of the auto-cruise control device 6, which is inhibited by the temporary inhibiting means, when the latter condition disappears. It is also possible to automatically recover the control of the auto-cruise control means 6 when the start means 1 satisfies the automatic start condition during the control is inhibited by the temporary inhibiting means. As mentioned, in the state where the auto-cruise control is inhibited by some operation of the driver, a history related to the temporal inhibition of the control is erased completely when at least an engine key switch is turned off temporarily and then it is turned on.

Figure 4:
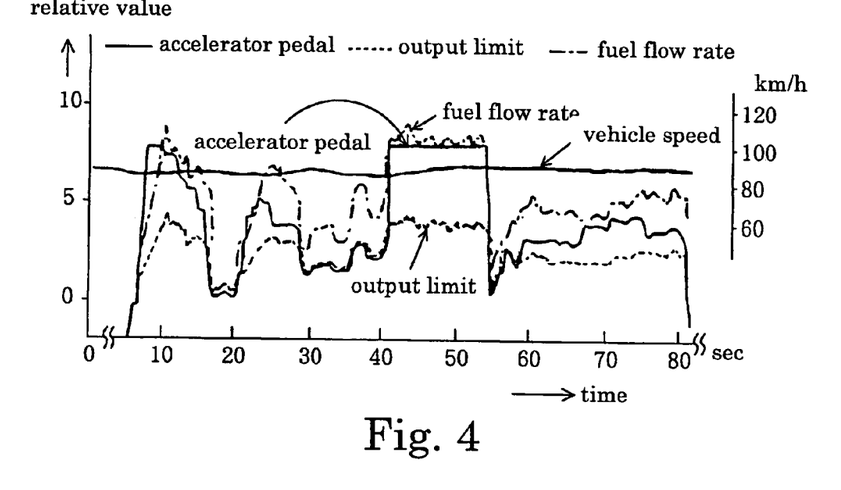
FIG. 4 is a graph showing a change of an aimed speed of a motor vehicle for the acceleration control device shown in FIG. 1.
Figure 5:
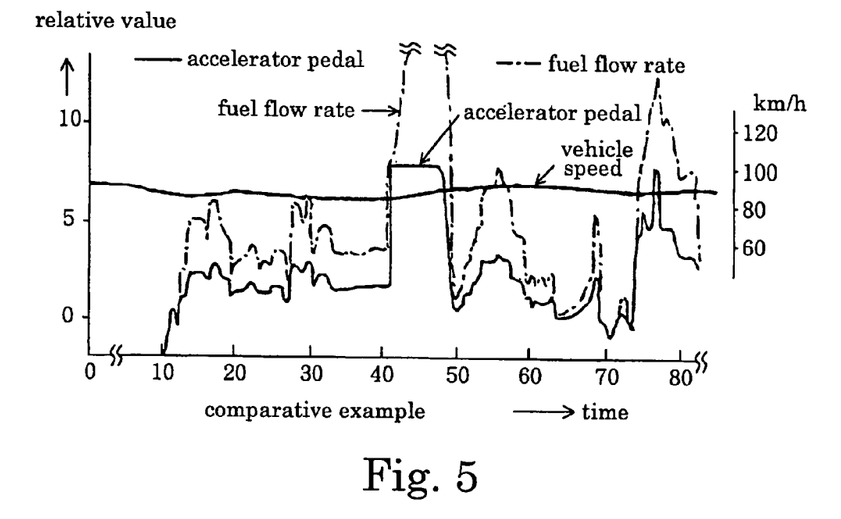
FIG. 5 is a graph showing a change of an aimed speed of a motor vehicle when the control of the acceleration control device shown in FIG. 1 is not used.

The inventors of the present invention conducted various tests on the acceleration control device. Result of one of the tests will be described with reference to FIG. 4 and FIG. 5, in which FIG. 4 shows plots of measured values of the vehicle speed, the accelerator pedal depression, the flow rate of fuel and the output limitation for the acceleration control device of the present invention in a certain state and FIG. 5 shows plots of the measured values thereof in substantially the same state when the acceleration control device of the present invention is not utilized. Abscissa indicates an amount of time elapsed and ordinate indicates relative value from 0 to 10. The measurement was performed by actually running a 6-ton cargo vehicle, which is loaded with a moderate payload, along a freeway. The experiment was conducted by changing the amount of depression of the accelerator pedal of the cargo vehicle, which is running at 90 Km/h, which is the maximum speed allowed for the cargo vehicle, every period of 15 seconds. Measured vehicle speeds are shown on a right side scale in FIG. 4 and FIG. 5.

The depression of the accelerator pedal was executed by a driver as shown by the solid line in FIG. 4. In the acceleration control device of the present invention, the depression amount of the accelerator pedal does not reflect the amount of accelerator control directly. That is, the acceleration control device is activated according to the depression of the accelerator pedal to produce the control output shown by the dotted line and the control output becomes an actual accelerator opening. Chain line curves show measured values of flow rate (cc/sec) of fuel supplied to the engine according to the accelerator opening.

Paying attention to a time period from 40 seconds to 55 seconds in FIG. 4, the accelerator pedal is substantially depressed by the driver as shown by the solid line. The control output of the acceleration control device of the present invention is changed correspondingly to the depression of the accelerator pedal as shown by the dotted line in FIG. 4. The control output does not take an extreme value suddenly. That is, the control output is controlled such that the acceleration is performed step by step as mentioned previously. In other words, the accelerator opening (control output), which is increasing, is controlled to a reasonable value. Therefore, the flow rate of fuel, which is shown by a chain line, is totally regulated finely. Further, looking at the time period from 40 seconds to 55 seconds, it is clear that the fuel is supplied while repeatedly increasing and decreasing with a period of about 3 seconds, so that the vehicle speed is gradually increased correspondingly thereto.

In the comparative example shown in FIG. 5, however, the accelerator opening is in direct proportion to the amount of depression of the accelerator pedal. In FIG. 5, when the accelerator pedal is substantially depressed by the driver at a time of about 40 seconds on the time axis, the flow rate of fuel is suddenly increased beyond the scale. It is clear that, although the vehicle speed increases with the increase of the fuel supply, the increase of vehicle speed does not directly correspond to the depression amount of the accelerator pedal. That is, it is clear that, although the fuel supply is substantially increased by the sudden depression of the accelerator pedal, the excess fuel may not be effectively burnt but merely consumed as black smoke from an exhaust pipe.

Figure 6:
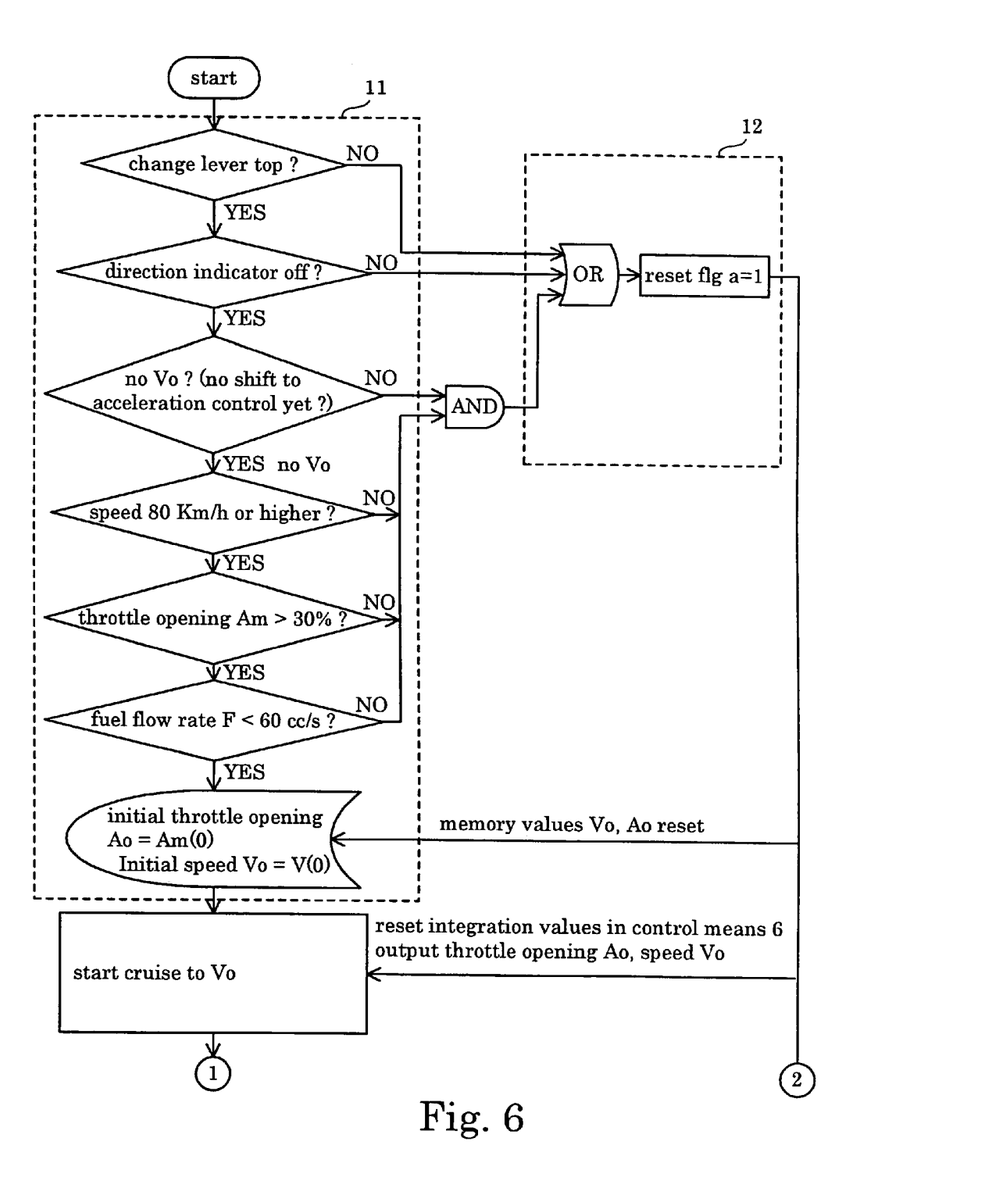
FIG. 6 is a control flow chart of an operation of the acceleration control device according to an embodiment the present invention.
Figure 7:
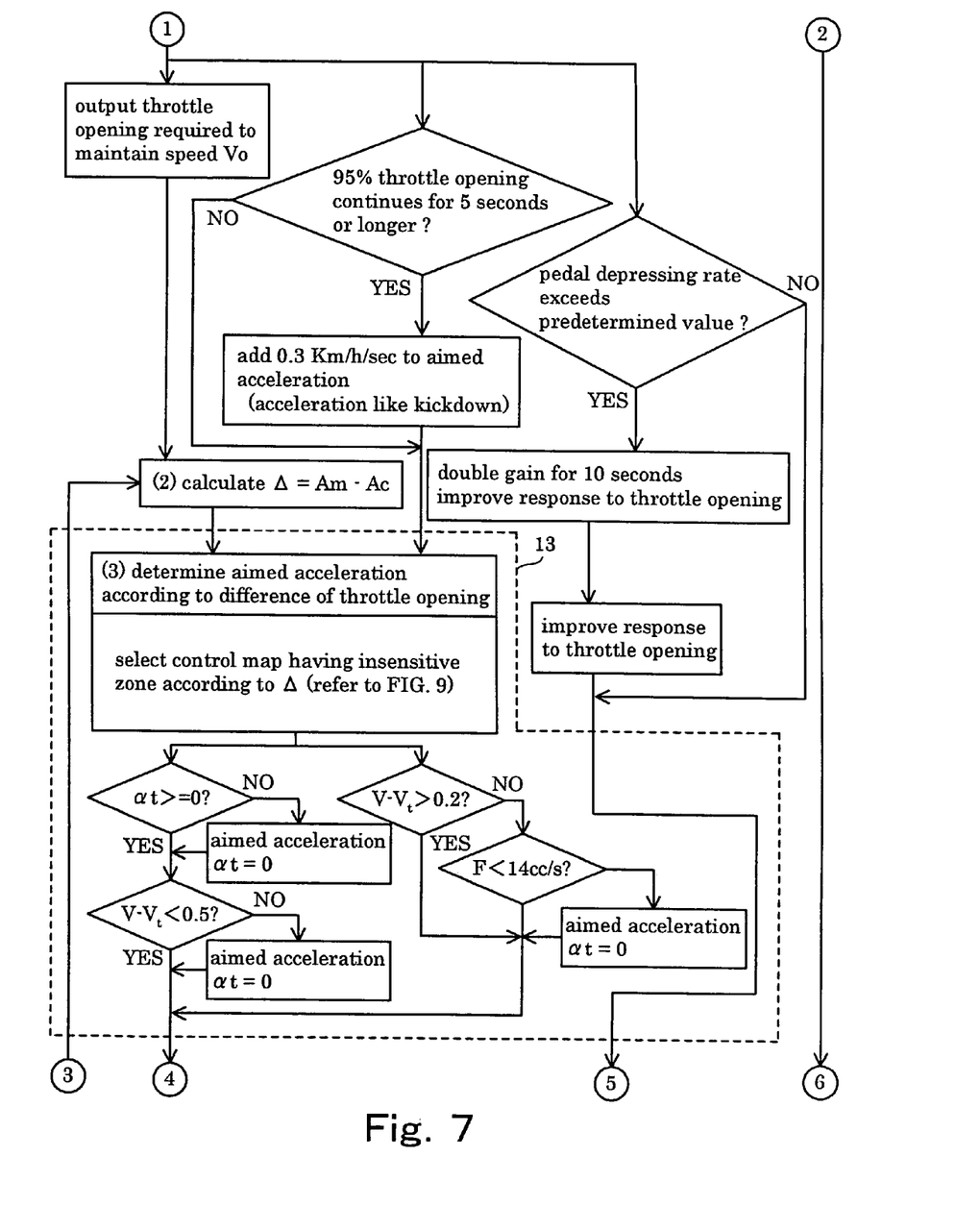
FIG. 7 is a control flow chart of another operation of the acceleration control device according to an embodiment the present invention.
Figure 8:
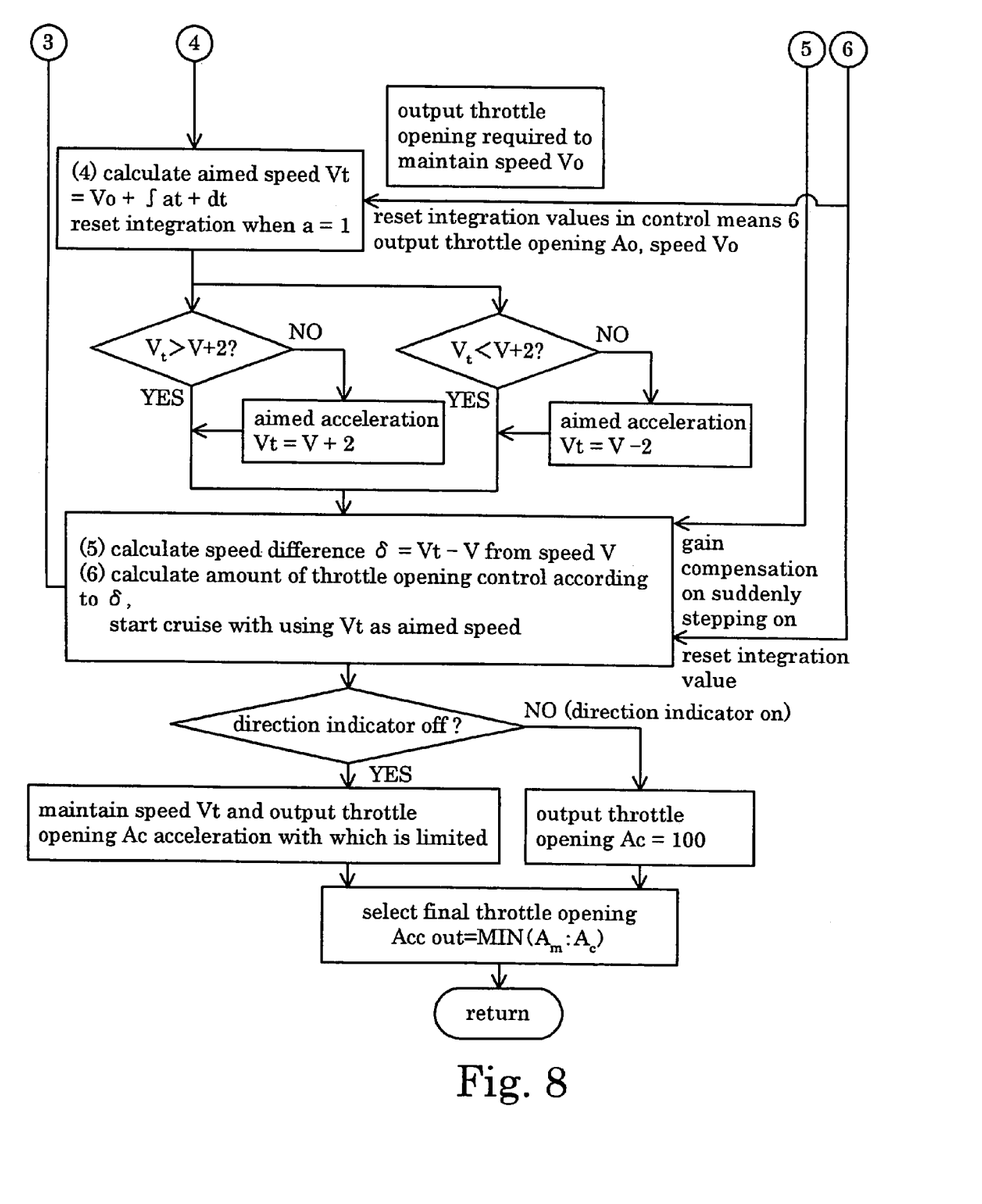
FIG. 8 is a control flow chart of an operation of the acceleration control device according to an embodiment the present invention.

FIG. 6 to FIG. 9 shows control flow charts of operations of main portions of the acceleration control device of the present invention. Terminals indicated by numerals 1 and 2 in FIG. 6 are connected to terminals 1 and 2 in FIG. 7, respectively, and terminals 3, 4, 5 and 6 in FIG. 7 are connected to terminals 3, 4, 5 and 6 in FIG. 8, respectively.

A portion in FIG. 6 defined by a dotted line 11 is a control portion for automatically starting the auto-cruise control without requiring an operation of a driver. A portion in FIG. 6 defined by a dotted line 12 is a logic related to resetting of parameters for automatically starting the auto-cruise control. The portion 12 resets the integrated value of the auto-cruise control means 6 according to AND logic and OR logic. A portion in FIG. 7 defined by a dotted line 13 is an operation portion of the aimed acceleration calculation means 3. Since these flow charts shown in FIG. 6 to FIG. 8 can be understood by referring to the description therein, detailed description thereof is omitted. It is possible to design the program control circuit for executing the control logic of the present invention according the flow charts.

Figure 9:
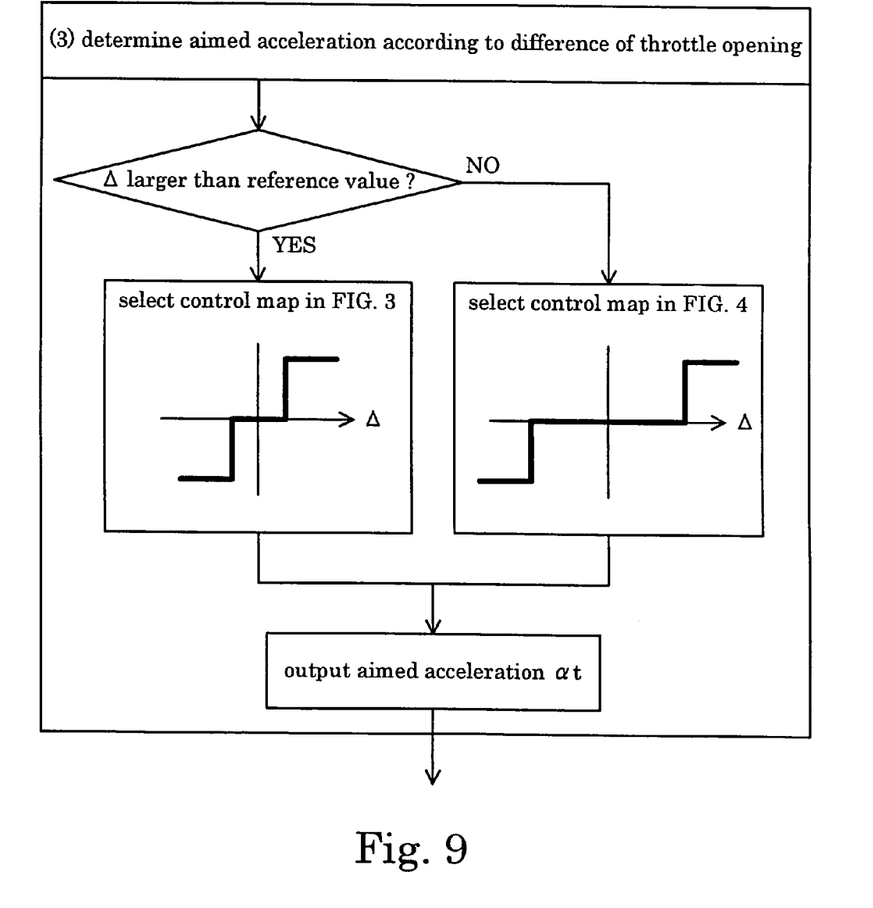
FIG. 9 is a flow chart of an operation related to a control map selection of the acceleration control device according to an embodiment the present invention.

FIG. 9 shows a flow chart related to the control map selection, which constitutes the features of the present invention.

When the acceleration control device according to the present invention is applied to commercial vehicles, it is possible to realize fuel economy and to restrict exhaust gas.

What is claimed is:

1. An acceleration control device comprising:
    calculation means for calculating an aimed accelerator opening (Ac) according to an information of a depressing amount (Am) of an accelerator pedal of a motor vehicle and a current vehicle speed (V);
    accelerator opening difference detection means;
    means for providing a control output according to which a difference ($\Delta$=Am–Ac) of accelerator opening approaches zero;
    start means for automatically starting the calculation of the aimed accelerator opening (Ac) when a constant speed running state of said motor vehicle is detected from the information including the vehicle speed (V); and
    aimed accelerator opening calculation means for calculating the aimed accelerator opening (Ac) according to a vehicle speed difference ($\delta$=Vt–V) between a hypothetic aimed vehicle speed (Vt) and the vehicle speed (V) while sequentially changing the hypothetic aimed vehicle speed (Vt) little by little according to the accelerator opening difference ($\Delta$) and the vehicle speed (V),
    which is characterized in that said accelerator opening difference detection means includes means for providing a plurality of control maps including a first control map for light load having the insensitive zone, which is provided in the vicinity of a position of the control map at which the accelerator opening difference ($\Delta$) becomes zero ($\Delta$=0) and which outputs the throttle opening difference as constantly zero, and a second control map for heavy load, which has a very narrow insensitive zone in the vicinity of a position of the control map at which the accelerator opening difference ($\Delta$) is zero and selecting one of the plurality of control maps according to an output of the accelerator opening difference detection means.

2. An acceleration control device comprising:
    first aimed accelerator opening calculation means for calculating an aimed accelerator opening (Ac) according to an information of depressing amount (Am) of an accelerator pedal of a motor vehicle and a current vehicle speed (V);
    means for providing a control output according to which a difference ($\Delta$=Am–Ac) of accelerator opening approaches zero;
    start means (1) for automatically activate the calculation of the aimed throttle opening (Ac) when it is detected from the information including the vehicle speed (V) that the vehicle is in a constant running state; and
    second aimed accelerator opening calculation means (2, 3, 4, 5, 6) for calculating the aimed throttle opening (Ac) according to a vehicle speed difference ($\delta$=Vt–V) between a hypothetic aimed vehicle speed (Vt) and the vehicle speed (V) while sequentially changing the hypothetic aimed vehicle speed (Vt) little by little according to the accelerator opening difference ($\Delta$) and the vehicle speed (V),
    wherein;
    said start means (1) includes, as input information for detecting that the vehicle is in a constant running state, an information related to the depression amount (Am) of the acceleration pedal, a fuel flow rate (F) and a position (Tm) of a change lever, in addition to the vehicle speed (V), and said second aimed accelerator opening calculation means (2, 3, 4, 5, 6) including accelerator opening difference detection means (2) for identifying the difference ($\Delta$) of accelerator opening, aimed acceleration calculation means (3) for calculating an aimed acceleration ($\alpha t$) from an output of said accelerator opening difference detection means, hypothetic aimed vehicle speed calculation means (4) for calculating the hypothetic aimed vehicle speed (Vt) from the aimed acceleration ($\alpha t$) and an initial speed (Vo) detected by said start means (1), speed difference calculation means (5) for calculating the vehicle speed difference ($\delta$) between the hypothetic aimed vehicle speed (Vt) and the vehicle speed (V) and auto-cruise control means (6) for calculating the aimed accelerator opening (Ac) according to the vehicle speed difference ($\delta$) and an initial accelerator opening (Ao) generated by said start means (1);

and wherein said acceleration control device further comprises inhibiting means for temporarily inhibiting the control of said auto-cruise control means when a specific operation is performed by a driver and inputting the information (Am) of the accelerator pedal directly or through a constant function to an engine of said vehicle as an acceleration input, which is characterized in that the specific operation includes an operation in which a direction indicator is operated and said accelerator pedal is depressed beyond a predetermined amount or an operation in which said accelerator pedal is depressed beyond a predetermined amount in a shift up mode.

* * * * *